(12) United States Patent
Ruchonnet

(10) Patent No.: US 6,226,232 B1
(45) Date of Patent: May 1, 2001

(54) ARTICLE COMPRISING AT LEAST A MOBILE DECORATIVE ELEMENT

(75) Inventor: Jean-Francois Ruchonnet, Vessy (CH)

(73) Assignee: Chopard International S.A. (CH)

( * ) Notice: Subject to any disclaimer, the term of this patent is extended or adjusted under 35 U.S.C. 154(b) by 0 days.

(21) Appl. No.: 09/319,180

(22) PCT Filed: Dec. 22, 1997

(86) PCT No.: PCT/IB97/01592

§ 371 Date: May 30, 2000

§ 102(e) Date: May 30, 2000

(87) PCT Pub. No.: WO98/28668

PCT Pub. Date: Jul. 2, 1998

(Under 37 CFR 1.47)

(30) Foreign Application Priority Data

Mar. 18, 1997 (FR) .................................................. 97/03505

(51) Int. Cl.⁷ .......................... G04B 19/00; G04B 37/00; A44C 17/02; G02C 11/02
(52) U.S. Cl. .................................. 368/223; 63/31; 351/51
(58) Field of Search .............................. 368/76, 80, 88, 368/223, 228, 276, 285; 351/51, 111; 63/1.14, 31

(56) References Cited

U.S. PATENT DOCUMENTS 4,187,697  *  2/1980  Castelo .
5,119,350  *  6/1992  Delacretaz .
5,751,667  *  5/1998  Nunes .

FOREIGN PATENT DOCUMENTS

609517    *  3/1979   (CH) .
680893    * 12/1992   (CH) .
308243    *  3/1989   (EP) .
2181939   *  5/1987   (GB) .
2225458   *  5/1990   (GB) .

* cited by examiner

*Primary Examiner*—Vit Miska
(74) *Attorney, Agent, or Firm*—Clifford W. Browning; Woodard, Emhardt, Naughton, Moriarty & McNett

(57) ABSTRACT

An article, which can be a watch, a piece of jewelry, a spectacle frame or a leather-ware item, for example, comprising at least one movable decorative element contained inside a housing (15) defined between two walls (5, 10) whose inner faces (5a, 10a) are parallel to one another, at least one (5) of these walls which is externally visible being transparent. This housing (15) encloses movable decorative elements (13, 14) each having an axis of revolution and two guide surfaces (14a, 14b), one of which is convex, respectively adjacent to said inner walls and being arranged to allow the movable decorative elements (13, 14) to move freely in translation and in rotation about their axes of revolution inside the housing (15). The internal faces (5a, 10a) of the housing (15) are dished with a curvature along at least one radius of curvature, which increases the glittering effect by increasing the speed of rotation of the mobile decorative element, such as a diamond.

15 Claims, 1 Drawing Sheet

ARTICLE COMPRISING AT LEAST A MOBILE DECORATIVE ELEMENT

Figure 1:
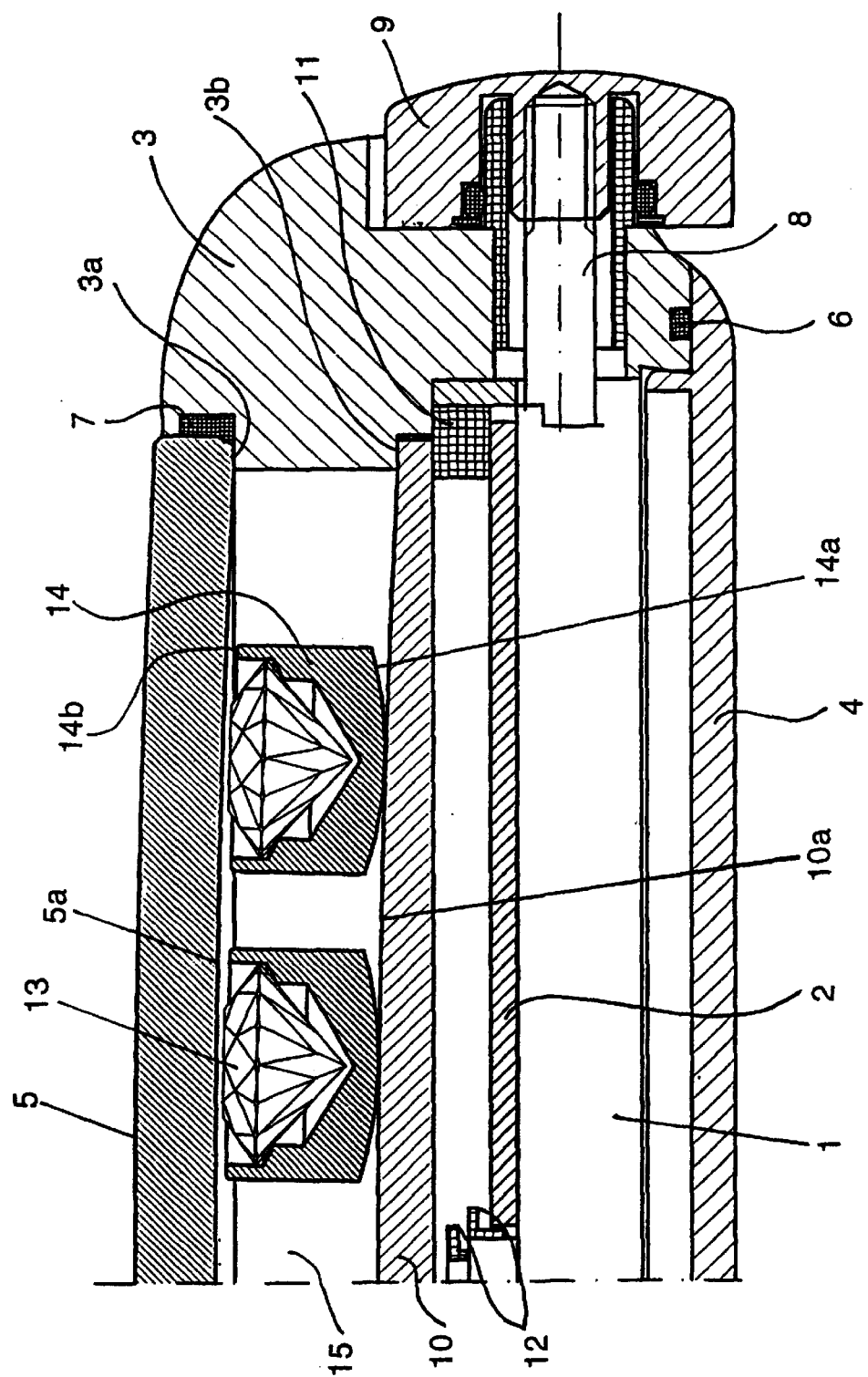

The present invention relates to articles adorned with movable decorative elements, these articles including purely decorative jewelry items such as rings or pendants, as well as utilitarian objects adorned with movable decorative elements, in particular watches, spectacle frames, or luxury leather goods.

The invention in particular relates to an article, notably a piece of jewelry, comprising a housing defined between two walls whose inner faces are parallel to one another. At least one of these walls, which is externally visible, is transparent. This housing encloses at least one movable decorative element having an axis of revolution and two guide surfaces respectively adjacent to said inner walls and arranged to allow said movable decorative element to move freely in translation and in rotation about said axis of revolution inside the housing.

A watch of this type has already been described in Swiss patent CH-G-609 517. The movable decorative elements, in particular diamonds, are mounted in supports in the form of small cylindrical collets having a convex external bottom face. This convex shape is chosen such as to reduce the frictional forces, thereby increasing the mobility of the support and hence of the movable decorative element.

This type of decorative element has been very successful for watches, as well as for other items of jewelry such as rings and pendants, and for spectacles.

The convex shape of the bottom of the movable decorative element's support produces an effect on the movements imparted to the support, for example as a result of inclining the rigorously flat parallel surfaces between which this support is guided so it moves with a translational movement. Due to the convexity of the external face of the bottom of the support cooperating with the flat surfaces of the housing's walls, it has been found that the translational movement of the support is in effect associated with a degree of rotation of the support about itself.

This rotational movement has a most interesting decorative effect. Whereas the random translational movement confers a definite eye appeal, rotation of the movable decorative element about itself produces—in particular with diamonds—an extremely pronounced glittering effect because it enhances the glittering produced by the diamond's multiple facets.

The principal object of the present invention is to substantially increase the glittering effect of for example diamonds as movable decorative elements, by increasing the rotation of these movable decorative elements about themselves.

To achieve this, the present invention concerns an article of the above-mentioned type, notably a jewelry article, characterized by the fact that said internal faces of said housing are dished with a curvature along at least one radius of curvature.

In a totally unexpected and surprising manner, it has been observed that slightly dishing the inner faces of the housing between which the movable decorative element is guided leads to a spectacular increase in the speed of rotation of these movable decorative elements about themselves.

It can of course be explained why the convex-bottomed small collets of the decorative elements turn when they move in translation. To allow for movement, a given play must be allowed between the guide surface of the movable decorative elements and the parallel walls of the housing. As the convex bottom of the collet carrying the movable decorative element remains in contact with the adjacent convex face of the housing, it touches this face only at its centre. On the opposite side, its guide surface cooperating with the housing's upper face consists of the annular edge of the collet carrying the movable decorative element, so that only a portion of its periphery is in contact with the housing's adjacent wall. As a result, the points of contact of the two guide surfaces are out of alignment with the collet's axis of revolution. Consequently, when the housing's surface is inclined to impart movement of the movable decorative element, a torque is produced about this axis of revolution.

Nevertheless, it is most surprising to observe that only a slight dishing of the surfaces of the housing containing the decorative elements leads to such a great increase in the rotational effect of these elements.

Another advantage of this invention is that it enables a reduction in the overall height of the article of jewelry, in particular by enabling the thickness of the glass to be reduced, as well as a possible reduction in the collet's height.

Further features and advantages of the present invention will be apparent from the following description, as well as from the single FIGURE of the accompanying drawings which, schematically and by way of example, illustrates an embodiment of the article with a movable decorative element according to the invention, here shown as a watch in axial cross-section.

The watch illustrated in this FIGURE comprises a movement 1 fitted with a dial 2 housed in a casing comprising a middle 3 which is closed on one side by a bottom 4 and on the other side by a glass 5. A first seal 6 is arranged between the bottom 4 and middle 4 and another seal 7 is arranged between the glass 5 and middle 3. A winding and time-setting stem 8 (which, for a quartz watch, would only serve for time-setting) extends through the middle 3 and carries a crown 9 secured to its inter end.

A second glass 10 is arranged between the glass 5 and dial 2. A spacer 11 maintains a selected spacing between this second glass 10 and the dial 2 to allow rotation of the indicating hands 12.

As can be seen on the FIGURE, the respective inner faces 5a and 10a of the glasses 5 and 10 are each applied against a shoulder 3a, 3b respectively in the inner face of the middle 3, providing therebetween a housing 15 of predetermined height. The respective inner faces of these glasses have a slight dishing formed by one or several radii of curvature about one or several centres or axes of curvature, notably about different cross-sectional planes. The respective curvatures of these two internal faces 5a, 10a relative to one another are strictly identical so that the height of the housing 15 formed therebetween remains constant.

Movable decorative elements, in this example diamonds 13 secured in cylindrical sleeves or collets 14 are arranged in the housing 15. Each cylindrical collet 14, whose bottom 14a is curved, contacts the upper face 10a of the second glass 10 defining the housing 15. The rounded annular edge 14b of collet 14 extends to a level slightly above the upper face of the diamond 13 to avoid contract between the diamond 13 and glass 5. The height from the curved bottom 14b to the annular edge 14 is smaller by about several hundredths of a millimeter, for instance between 0.05 and 0.1 mm, than the distance separating the inner faces 5a, 10a of glasses 5, 10, to allow for a movement of the collets 14, in translation and rotation about their respective axes of revolution, in the housing 15.

As a variation, taking into account the curvature of the face 10a of housing 15, the bottom 14a of collet 14 could be flat or only slightly curved (convex), without cancelling the rotational effect although this effect would be reduced. However, this expedient would enable a reduction in the thickness of the collet 14 and hence of the housing 15 and of the watch.

To avoid any wear resulting from movement of the support 14 in the housing 15, the inner surfaces 5a, 10a of glasses 5 and 10, must be smooth and made of a hard material that is not liable to be scratched.

The collets 14 in which the diamonds 13 are supported are preferably made of a precious metal, for example gold, used in the jewelry trade for mounting diamonds. It is however possible to use other metals such as stainless steel, for instance.

In embodiments where, as in the illustrated example, the two walls of the housing are formed by glasses, these will preferably be made of sapphire. If the inner glass 10, or a part thereof, does not cover the dial 2, but for example is limited to an annular zone arranged about the dial 2, the curved face 10a need not be transparent. In this case, instead of a sapphire glass, the wall 10 can be made of another suitable material, for example a stone or a ceramic.

As illustrated, the two faces of the outer glass 5 are parallel and dished, whereas only the upper face 10a of the glass 10 is dished. The fact that the outer glass is dished (on both sides) increases it strength, so that its thickness can be reduced, enabling a corresponding reduction of the jewelry article's thickness. This is particularly important for watches.

The necessary degree of dishing to produce an effect on the rotational speed of the movable decorative elements 13 is very small. Tests have shown that the optimum rise is situated between 0.5 and 1 mm for a glass with a diameter of 20 mm, with a much bigger rise, movement of the diamonds tends to become restricted to the peripheral zone of housing 15.

The invention is of course not limited to circular glasses, It can also be applied to glasses of polygonal shape, for example rectangular or square. In this case, the dishing can have several different radii and several focal points. It is also possible to envisage that the glass is formed by a portion of a cylinder, in particular for rectangular glasses. In this case, the speed of rotation of the movable decorative elements will be greater when they move transversally than when they move parallel to the cylinder's generatrix.

Movement of the movable decorative elements 13, 14 in the housing is purely at random. The greater the rotation speed, the slower the translational speed, and vice versa. The movable decorative elements 13, 14 can turn in either direction according to the direction of the torque which is produced to initiate the movement of these decorative elements. As this direction is entirely at random, when the housing contains several movable decorative elements, these elements can turn at different speeds in different directions, which produces a surprising and spectacular effect.

Of course, instead of the illustrated embodiments, where the housing 15 for the movable elements 13, 14 is superimposed on the dial 2, this housing could occupy a peripheral annular zone about the dial as shown in FIGS. 1 and 3 or Swiss Patent CH-G-609 517.

As mentioned previously, the invention is not limited to watches, but is applicable to all sorts of articles, notable jewelry such as rings and pendants, as well as to spectacle frames, or even to pens. It is also possible to envisage articles with movable decorative elements according to the invention associated with luxury leather-ware goods, such as handbags. Generally speaking, these movable decorative elements can be applied to any utilitarian article in order to give it an original aesthetic appearance.

What is claimed is:

1. An article comprising at least one movable decorative element contained inside a housing (15) defined between two walls (5, 10) whose internal faces (5a, 10a) are parallel to one another, at least one (5) of these walls which is externally visible being transparent, the or each movable decorative element (13, 14) having an axis of revolution and two guide surfaces (14a, 14b) respectively adjacent to said internal faces and being arranged to allow said movable decorative element (13, 14) to move freely in translation and in rotation about said axis of revolution inside said housing (15), characterized by the fact that said internal faces (5a, 10a) of said housing (15) are dished with a curvature along at least one radius of curvature.

2. Article according to claim 1, characterized in that said walls (5, 10) are made of at least one material having a hardness comparable to that of sapphire.

3. Article according to claim 1, characterized in that the two faces of at least the externally visible wall (5) are parallel to one another.

4. Article according to claim 1, characterized in that the rise of said dished internal faces (5a, 10a) is between 0.5 and 1 mm for a diameter of 20 mm.

5. Article according to claim 4, characterized in that said dished internal faces (5a, 10a) of said housing (15) are spherical domes.

6. Article according to 4, characterized in that said dished internal faces (5a, 10a) of said housing (15) are defined by convex polygons.

7. Article according to claim 6, characterized in that said dished internal faces (5a, 10a) of said housing (15) are dished according to several radii and have several focal points.

8. Article according to claim 1, characterized in that said movable decorative element is a precious stone, notably a diamond (13), mounted in a collet (14).

9. Article according to claim 8, characterized in that the bottom of said collet (14) has a convex surface.

10. Article according to claim 8, characterized in that there is a play of from 0.05 to 0.1 mm between the height of said collet (14) and the height of the housing (15).

11. Article according to claim 8, characterized in that said collet (14) is made of precious metal.

12. An article according to claim 1, in which the article is a watch.

13. An article according to claim 1, in which the article is jewelry.

14. An article according to claim 1, in which the article is a spectacle frame.

15. An article according to claim 1, in which the article is an item of leather goods.

* * * * *

UNITED STATES PATENT AND TRADEMARK OFFICE
CERTIFICATE OF CORRECTION

PATENT NO. : 6,226,232 B1
DATED : May 1, 2001
INVENTOR(S) : Jean-Francois Ruchonnet It is certified that error appears in the above-identified patent and that said Letters Patent is hereby corrected as shown below:

<u>Column 4,</u>
Line 36, please insert the word -- claim -- before the number "4."

Signed and Sealed this

Nineteenth Day of March, 2002

Attest:

JAMES E. ROGAN
*Director of the United States Patent and Trademark Office*

*Attesting Officer*